July 27, 1971      P. S. WIELINGA      3,595,947
METHOD OF MANUFACTURING STRUCTURAL ELEMENTS
Filed March 3, 1967
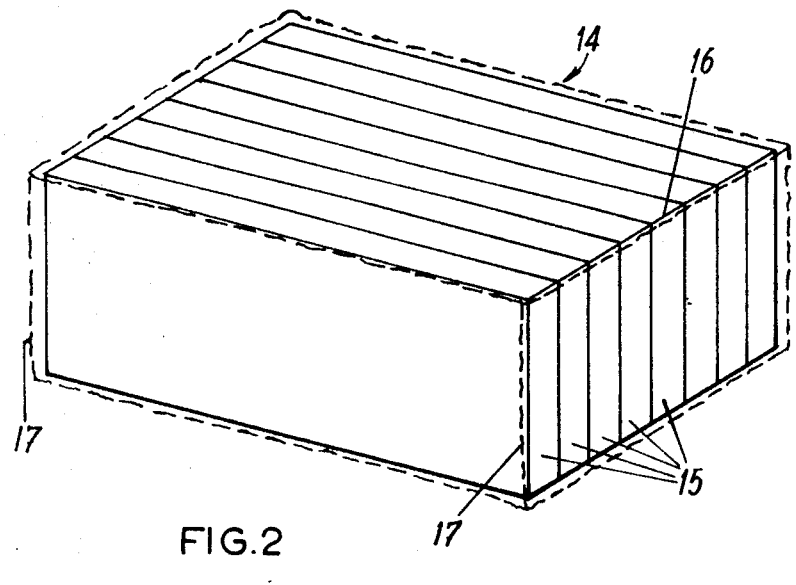
FIG.2
FIG.1
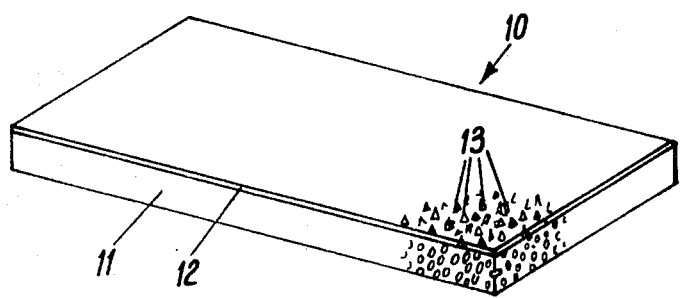
INVENTOR
PIETER SIMON WIELINGA
BY
ATTORNEY «United States Patent Office»

3,595,947
Patented July 27, 1971

3,595,947
METHOD OF MANUFACTURING STRUCTURAL ELEMENTS
Pieter Simon Wielinga, Vuren an der Waal, Netherlands, assignor to Fabriek van Bouwmaterialen "Loevestein" N.V., Vuren an der Wall, Netherlands
Filed Mar. 3, 1967, Ser. No. 620,485
Claims priority, application Netherlands, Mar. 4, 1966, 6602812
Int. B29h 7/20; B44c 3/20
U.S. Cl. 264—42    9 Claims

ABSTRACT OF THE DISCLOSURE

A structural element of cellular concrete having a surface layer of concrete is formed by first molding a concrete body having a cellular-forming substance, hardening the cellular body formed therefrom, applying an outer layer of concrete material of substantially the same components as the cellular concrete body but without the cellular-forming substance, and then subjecting the body to the action of steam under superatmospheric pressure, whereby to harden said layer.

---

This invention relates to structural elements made from concrete, such as cellular concrete, and to methods of manufacturing the same.

It has been common practice in the art of construction to improve the outer appearance and/or the weather resistance of a structural element made from normal or cellular concrete by applying to it an outer layer of stucco, sometimes with amounts of stone or quartz added thereto. However, applying stucco layers to structural elements on the construction site is expensive due to the required skill of the persons employed in it.

According to a second method known in the art, stucco layers are applied to concrete bodies by machinery. This method may easily be accomplished in a factory, when the bodies are positioned horizontally on a moving belt. Thereafter, the body and outer layer assemblies are stored during an extended period of time in order to allow the outer layer to set. This setting phenomenon, however, requires extensive storage room.

A disadvantage common to both methods is that a stucco layer, even when applied with great care, may crack and loosen from the concrete body during use, e.g. due to rapid changes of temperature in summer or winter.

In recent days, there have become known structural elements, predominantly composed of a body of cellular concrete and, at least on one of its sides, an outer layer of material mainly having the same components as cellular concrete but substantially without its gas-evolving component. Such elements may be made by a method wherein both said body and said outer layer are hardened (caused to set) by means of steam of superatmospheric pressure. This known method is effected by using the following three manufacturing steps:

(a) introducing the material of said outer layer into a mold,
(b) positioning the material of said cellular concrete body onto the material of the outer layer in the mold, and
(c) hardening said materials by means of steam of superatmospheric pressure.

This known method is rather expensive in view of the great number of molds required.

It has now been found that the disadvantages of the known methods may be overcome or to a great extent avoided and that structural elements composed of a body of concrete, such as cellular concrete, and an outer layer of different material, such as concrete, e.g. a material having the same components as cellular concrete but without its gas-evolving component, may be made in a convenient way by using a new manufacturing method involving a sequence of consecutive steps.

Accordingly, it is an object of the invention to provide an improved method for manufacturing structural elements of the type specified which does not have the aforesaid disadvantages. More particularly, it is an object to provide structural elements predominantly composed of a body of concrete and an outer layer on at least one of its sides, which can conveniently be made by machinery which can be hardened rapidly and needs no extensive storage room. A further object is to provide a structural element and a manufacturing method therefor, in which the outer layer does not crack and loosen from the body during use. More particularly, it is an object to provide a structural element predominantly composed of a body of concrete, e.g. cellular concrete, and on at least one of its sides, an outer layer of concrete, e.g. a material having the same components as cellular concrete but without its gas-evolving substance, and moreover a method of manufacturing it, wherein special measures are taken to improve the adherence of the outer layer to the body. A further object is to provide a method of manufacturing structural elements of the type specified wherein special additives are incorporated in the outer layer for improving the adherence of the outer layer to the body. Still another object is to provide a structural element composed of a body of concrete, e.g. cellular concrete, and on at least one of its sides, an outer layer of concrete, e.g. a material having mainly the same components as cellular concrete but without its gas-evolving substance, and, moreover, a manufacturing method therefor in which the outer appearance of the element has greatly been improved.

Further objects and characteristics of the invention will appear from the following detailed description.

In a typical embodiment of the invention, as applied to the manufacture of a structural element predominantly composed of a body of concrete, e.g. cellular concrete, and, on at least one of its sides, an outer layer of concrete, e.g. a material mainly having the same components as cellular concrete but substantially without its gas-evolving substance, the novel method comprises the following four consecutive steps:

(a) pre-fabricating the body of the element,
(b) hardening said body,
(c) applying an outer layer to said hardened body, and
(d) hardening said outer layer by treating the assembly of body and outer layer with steam of superatmospheric pressure.

Such treatment with steam of superatmospheric pressure leads to a quicker, and moreover, better setting of the outer layer.

Although it may seem that this invented method is more tedious and cumbersome than the aforesaid known method by its having one manufacturing step in addition, it has been shown in reality that the novel method is more advantageous especially when effected for manufacturing a plurality of structural elements. If the method is carried out on a large scale, the bodies of the elements may be fabricated (in a manner known per se) from a large block of concrete (e.g. cellular concrete) by intersecting or cutting this block into parts of the same dimensions as the bodies to be formed and by taking this block into pieces for the purpose of applying outer layers to the separate bodies only after the block has been hardened by means of steam of superatmospheric pressure. Neither during the separation of the intersected and hardened block, nor during the application of outer layers onto the hardened bodies, is there any risk of damaging the bodies; however, such risk is present when the pieces of intersected blocks while still in the plastic condition are coated with an outer layer.

A distinct advantage of the novel method resides in the fact that it opens up more possibilities for improving the outer appearance of the structural elements. Thus, it is possible now to strew or disperse grains of stone onto the surface of the outer layer. These grains will partly protrude from the outer layer and thus form a surface having a fine open structure. Such an open structure could not be obtained with the last-mentioned known method since the grains would have to be strewn or dispersed onto the bottom of the mold and the mortar introduced thereupon would envelop the grains nearly completely.

A further advantage of the method provided by the invention is that several methods can be practiced to adhere the outer layer firmly to the body of the element.

It can be imagined that the adherence of an outer layer applied in the plastic condition to an already hardened body may cause some difficulties and that there is a risk of disruption of either the body or the outer layer during hardening of the latter. This risk of disruption poses a problem, indeed, but it can be prevented in several ways thanks to further developments of the novel method.

According to a first way of improving the adherence between body and outer layer, the structural element is subjected to vibrations after applying the outer layer but prior to hardening of the same. During this treatment, mortar of the outer layer penetrates into the surface pores of the hard cellular concrete of the body, thus bringing about a good adhesion between body and outer layer and preventing disruption. Moreover, the outer layer obtains a greater density by such vibrations and due to this greater density, the steam will pass the outer layer more uniformly. Further, the homogeneous, hardened, outer layer has a better resistance against weather conditions.

If grains of stone or quartz are strewn or dispersed onto the outer layer before subjecting the element to vibrations, then these grains will penetrate partly into the mortar of the outer layer. The joint between grains and outer layer is very firm then, whilst the desired open structure is nevertheless maintained.

In the aforesaid known method of making structural elements, it was not possible to subject a mold to vibration while the outer layer and the plastic body of cellular concrete contained therein was still plastic, prior to hardening. The reason is that cellular concrete in plastic condition simply cannot endure such vibrations.

According to a second way of improving the adherence between body and outer layer, special additions are incorporated in the mortar of the outer layer. In this way, the disruption of the structural element or of its outer layer can be prevented with certainty even when no vibrations are applied.

The additives as used may be substances that are known per se as additives to mortars for improving the adherence of outer layers to surfaces. As a typical example thereof, an addition to the mortar of the outer layer of about 5% of a compound selected from the group of cellulose ethers, e.g. ethyl hydroxyethyl cellulose, may be mentioned.

Still better results may be obtained by adding about 0.5% of hydroxyethyl cellulose to the mortar of the outer layer.

Proportions of about 0.3% by weight, will usually suffice already for obtaining an improved adherence.

It is desirable to wet the outer face of the body before applying the outer layer to it.

As an alternative, it is possible to sprinkle water containing a compound selected from the group of cellulose ethers onto the outside of said body prior to applying the outer layer.

The invention will be illustrated now by the following description of a preferred embodiment, using the accompanying drawing as a basis. In this drawing, FIG. 1 is a perspective view of a structural element made in accordance with the method of the invention, and FIG. 2 is a perspective view of a block of cellular concrete during the manufacture of a plurality of bodies for a corresponding number of structural elements as shown in FIG. 1.

The flat rectangular element of FIG. 1 is composed of a body 11 of cellular concrete and an outer layer 12 including partly embedded stone grains 13.

According to preferred embodiment, a plurality of such structural elements is manufactured as follows:

First, a plurality of bodies 11 of cellular concrete is made in a conventional way. To this end, a large block 14 of cellular concrete in plastic condition is pre-fabricated by making a finely divided mixture of quartz-containing material, such as sand, together with a binder such as lime or cement, and a gas-evolving substance, such as aluminum or zinc, blending this mixture with water to form a suspension, introducing the suspension into a mold and harden the suspension in the mold till it has sufficient coherence to stand upright as a block of solid material. Then, this block 14 is intersected or cut by means of cutting threads or wires (not shown) into a great number of parts 15, the dimensions of each of these parts corresponding to those of the desired bodies 11. After removing, if necessary, of the upper crust 16 and side crust 18, the intersected block 14 is introduced into an autoclave and is hardened therein by means of steam of superatmospheric pressure, e.g. a pressure of 114 or 256 p.s.i. abs. Thereupon, the block 14 is divided into parts. The parts or bodies are placed in the flat position on a vibration table (not shown) and an aqueous slurry of a finely divided mixture of quartz-containing material and binder without gas-evolving substance is applied as an outer layer to the upper surface of each body 11. Preferably, ethyl hydroxyethyl cellulose or a similar water-soluble additive for improving the adherence of mortars to surfaces has been added to this slurry in a proportion of 0.5%.

Instead of the just-mentioned additive, one or more of the following substances may be used as an additive:

hydroxypropyl cellulose,
ethyl cellulose,
methyl ethyl cellulose,
methyl cellulose,
carboxymethyl cellulose,
sulfoethyl cellulose,
sulfomethyl cellulose.

These substances are added in a proportion of about 1% by weight of the mortar of the outer layer. In many cases, less than 1% will already be sufficient to obtain good results. An addition of 0.5% of hydroxyethyl cellulose is preferred.

After applying the outer layer 12 to the body 11, the vibration table and the structural element resting thereon are subjected to heavy vibrations.

If desired for improving the outer appearance of the structural element 10, stone grains 13 may be partly embedded into the outer layer 12. To this end, the grains 13 are strewn or dispersed onto the outer layer and then the element 10 is subjected or re-subjected to vibrations. Due to these vibrations, the mortar of the outer layer penetrates into the outer pores of the body 11 which results in a good adherence of the outer layer 12 to the body 11.

Finally, the assembly of hardened body and fresh outer layer 12 is introduced into an autoclave and treated with steam of superatmospheric pressure so as to harden the outer layer.

The outer layer may have a thickness of e.g. 0.2 to 2 centimetres and may contain or not contain other such as said stone grains 13 and pigments. In some cases, more than one side of the body 1 may be coated with an outer layer.

What I claim is:

1. In a method of manufacturing a structural element comprised of a body of cellular concrete and having on at least one face thereof an outer layer of concrete, the improvement which comprises,
   (a) providing a body of hardened cellular concrete,
   (b) applying as an outer layer a mortar of concrete containing a small but effective amount of a water soluble adhesive inducing additive compound of the class of cellulose ethers,
   (c) and then subjecting said body to the action of steam under superatmospheric pressure, whereby to harden said outer layer in firm adherence to said cellular body.

2. The method of claim 1, wherein stone grains are dispersed on said outer layer, and wherein prior to hardening the outer layer, the body is subjected to vibration in order to cause the stone grains to partly penetrate the layer and improve the appearance thereof.

3. A method of manufacturing a structural element comprised of a body of cellular concrete and having on at least one face thereof an outer layer of concrete which comprises,
   (a) providing a moldable mixture of cellular-forming concrete having a gas-evolving substance therein,
   (b) introducing said mixture into a mold whereby to form a body having a cellular structure due to the evolution of said gas,
   (c) hardening said cellular body,
   (d) applying as an outer layer a mortar of concrete, said layer of material having a small but effective amount of a water-soluble adhesive-inducing additive compound of the class of cellulose ethers therein for improving the adherence of said outer layer to said body of cellular concrete,
   (e) and then subjecting said body to the action of steam under superatmospheric pressure, whereby to harden said layer in firm adherence to said cellular concrete body.

4. The method of claim 3, wherein said additive for effecting further adherence of the outer layer to said cellular concrete body is contained in amounts of up to about 1% by weight, and wherein stone grains are dispersed on said outer layer, and wherein said body with said layer is subjected to vibration prior to the hardening of said layer in order to cause the stone grains to partly penetrate the layer of mortar.

5. The method of claim 4, wherein the additive is selected from the group consisting of hydroxyethyl cellulose, hydroxypropyl cellulose, ethyl cellulose, methyl ethyl cellulose, methyl cellulose, carboxymethyl cellulose, sulfoethyl cellulose and sulfomethyl cellulose.

6. The method of claim 5, wherein the additive is hydroxyethyl cellulose in an amount ranging from about 0.3% to 0.5% by weight.

7. A method of manufacturing a structural element comprised of a body of cellular concrete and having on at least one face thereof an outer layer of concrete which comprises,
   (a) providing a finely divided mixture of quartz-containing material together with a binder and a gas-evolving substance,
   (b) blending said mixture with water to form a suspension,
   (c) introducing said suspension into a mold,
   (d) hardening said suspension in the mold to form a block of semi-solid cellular structure,
   (e) cutting said cellular block to form an assembly of parallel parts of predetermined dimensions whereby to provide a plurality of cut faces,
   (f) introducing said assembly of parts into an autoclave and subjecting said assembly to the action of steam at superatmospheric pressure to further harden the block,
   (g) separating the parts from said block,
   (h) applying a mortar of concrete as an outer layer to an upper cut face of each one of said parts, said mortar having a small but effective amount of a water-soluble additive of the class of cellulose ethers therein for improving the adherence of the outer layer to the part, and
   (i) introducing the thus-treated assembly into an autoclave and subjecting it to the action of steam at superatmospheric pressure to harden said layer, whereby to harden said outer layer in firm adherence to said cellular body.

8. The method of claim 7, wherein the additive is selected from the group consisting of hydroxyethyl cellulose, hydroxypropyl cellulose, ethyl cellulose, methyl ethyl cellulose, methyl cellulose, carboxymethyl cellulose, sulfoethyl cellulose and sulfomethyl celllulose in an amount of up to about 1% by weight.

9. The method of claim 8, wherein the additive is hydroxyethyl cellulose in an amount ranging from about 0.3% to 0.5% by weight.

References Cited

UNITED STATES PATENTS

| | | | |
|---|---|---|---|
| 3,380,940 | 4/1968 | Hansi | 117—123 |
| 3,327,032 | 6/1967 | Adams | 264—345X |
| 3,275,724 | 9/1966 | Klingel | 264—345 |
| 3,002,249 | 10/1961 | Jackson | 264—71X |
| 2,700,810 | 1/1955 | Garni | 264—71X |
| 2,296,453 | 9/1942 | Saffert | 264—69X |
| 1,376,321 | 4/1921 | Crozier | 264—69 |
| 610,776 | 9/1898 | Thomson | 117—123X |
| 1,518,398 | 12/1924 | Edie | 117—123X |
| 1,963,030 | 6/1934 | Powell | 264—42X |
| 2,522,116 | 9/1950 | Hayes | 264—42 |

ALFRED L. LEAVITT, Primary Examiner

A. GRIMALDI, Assistant Examiner

U.S. Cl. X.R.

117—4, 16, 26, 29, 70, 123, 169; 264—69, 70, 71, 333